June 23, 1970  T. A. ROEFARO  3,516,106
TOOL FOR DRESSING FRESHLY CUT MEAT
Filed Nov. 9, 1967
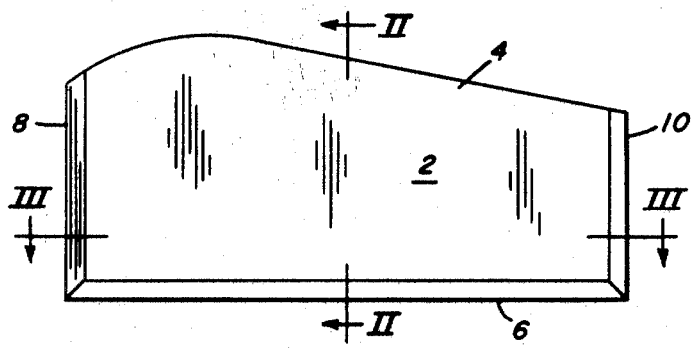
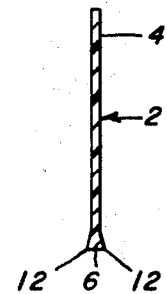
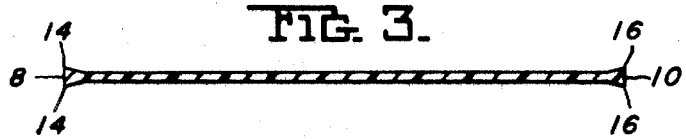
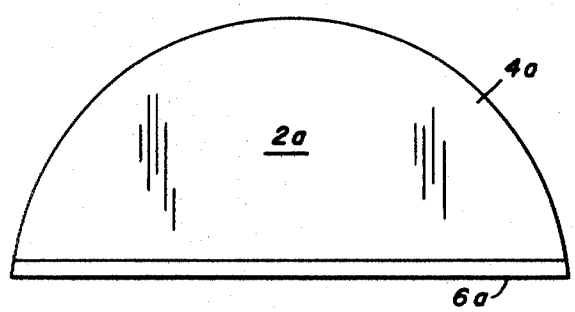
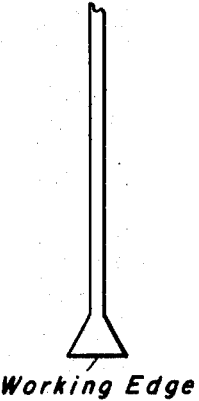
Working Edge
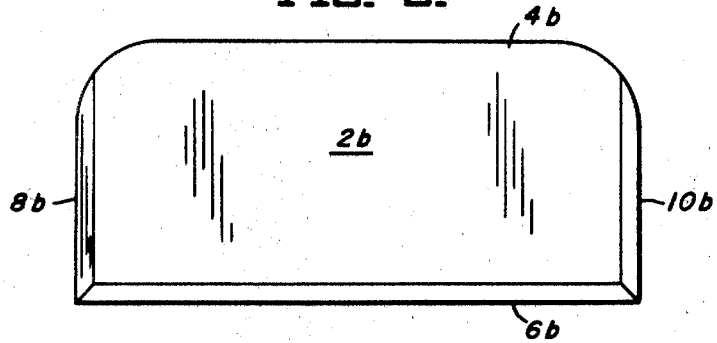
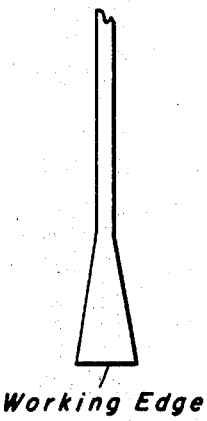
Working Edge
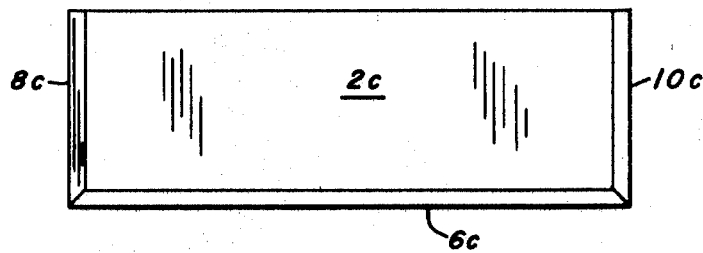
INVENTOR.
THOMAS A. ROEFARO
By Donald S. Ferito
Attorney United States Patent Office 3,516,106
Patented June 23, 1970

3,516,106
TOOL FOR DRESSING FRESHLY CUT MEAT
Thomas A. Roefaro, 135 N. Millvale Ave.,
Pittsburgh, Pa. 15224
Filed Nov. 9, 1967, Ser. No. 681,757
Int. Cl. A22c 17/00
U.S. Cl. 15—236           2 Claims

ABSTRACT OF THE DISCLOSURE

Tool comprises a resilient plastic sheet having a portion adapted to be manually grasped and one or more working edges each having a greater thickness at its extremity than the remainder of the sheet. Tool is utilized by passing one working edge thereof along the surfaces of freshly cut meat slices or pieces to remove bone dust, loose fat particles, etc. therefrom.

---

The present invention relates generally to food processing equipment and more particularly to a tool for dressing meat especially suitable for thoroughly cleaning the freshly cut surfaces of meat cuts easily and quickly without damaging the surfaces of the meat.

As is well known, in the processing of fresh meat today, cuts are usually made by means of a power saw. After the meat has been cut in this manner, the surfaces of the chops, slices, etc. which result must be cleaned to remove the bone dust and loose fat particles which have been deposited thereon as a result of the sawing operation. Such cleaning is necessary to render the meat cuts more palatable and make them attractive to the eye in the sales display case.

Prior to my invention, the problem of thus cleaning meat cuts assumed serious proportions in large retail supermarkets where large volumes of meat are handled daily and also in the establishments of meat purveyors to the restaurant, hotel and institutional trade because of the time and labor required to perform this necessary operation in the processing of fresh meat.

Freshly cut meat surfaces were usually cleaned, prior to my invention, by means of a tool which consisted of a plurality of thin metal blades bent in substantially circular form and arranged in a closely nested relation. A radially projecting handle was provided on the tool whereby it could be grasped by the meat processor and drawn across the surfaces of freshly cut meat. Such tools were generally unsatisfactory in use and in many instances damaged the meat by tearing the surface tissues thereof due to excessive pressure applied by the meat processor. This damage caused the meat surfaces to darken in a relatively short time and thus curtailed the showcase or shelf life of the meat cuts.

The blades of these prior art meat cleaning tools were of limited flexibility so that certain areas of the meat cut were often not cleaned when the tool was drawn thereover, for example, the area of a meat cut immediately surrounding a bone or the corner areas of relatively small cuts of meat. To obtain even limited success in cleaning fresh cuts of meat by the use of such tools it was necessary for the meat processor to manipulate the tool slowly and carefully. This fact, of course, added considerably to the time necessary to process the meat, and, therefore, increased the meat handling cost.

The close fitting blades of prior art meat cleaning tools were difficult to clean so that frequently bacteria would form and be deposited on the meat surfaces being processed.

Powered devices have also been developed in efforts to reduce the time and cost of cleaning freshly cut meat but these have proven unsatisfactory in performance and also have presented maintenance problems due to their complicated and unwieldly structures.

In some instances, prior to my invention, soft fabric cloths were used to wipe meat surfaces after cutting. This practice also proved unsatisfactory since it was unsanitary as well as inefficient. It was found that the cloths become contaminated with blood, and meat and bone particles in a very short time. Continued use then caused the cloths to pollute the meat or at best impart a foul odor thereto.

It is, accordingly, the primary object of my invention to provide an improved tool whereby surfaces of fresh cut meat can be quickly and thoroughly cleaned of residual bone, fat and meat particles after sawing.

It is another object of my invention to provide a tool of the character described which can be easily cleaned and sterilized.

It is yet another object of my invention to provide a tool of the character described which is flexible and sufficiently resilient to clean all areas of the surfaces of a freshly cut piece of meat notwithstanding its size.

It is a further object of my invention to provide a tool of the character described which is simple in structure and adapted to be readily manufactured from inexpensive materials.

It is a more specialized object of my invention to provide an improved tool for dressing meat cuts after sawing by removing residual particles of bone, meat and fat from the cut surfaces thereof which tool consists of a resilient plastic sheet having a portion adapted to be grasped manually, and at least one working edge of increased thickness spaced from the manually graspable portion.

These and other objects will become more apparent after referring to the following specification and attached drawing in which:

FIG. 1 is a front elevational view showing a preferred embodiment of the tool of the invention;

FIG. 2 is a vertical sectional view taken substantially along the line II—II of FIG. 1;

FIG. 3 is a longitudinal sectional view taken substantially along the line III—III of FIG. 1;

FIGS. 4, 5 and 6 are front elevational view showing modified embodiments of the tool of the invention;

FIG. 7 is a partial end elevational view showing the working edge of a modified embodiment of the tool of the invention; and FIG. 8 is a partial end elevational view similar to FIG. 7 showing the working edge of another modified embodiment of the tool of the invention.

Referring more particularly to the drawings, reference character 2 designates generally the body of the tool of my invention. Body 2 consists of a sheet of flexible, resilient plastic material formed with a portion 4 adapted to be grasped manually for the purpose of manipulating the tool in dressing a cut of fresh meat after sawing.

Body 2 may be provided with a straight working edge 6 along its bottom, a second straight working edge 8 which extends along one side of the body 4, and a third straight work edge 10 which extends along the side of body 2 opposite edge 8. The working edges 6, 8 and 10 vary in length so as to be adapted to be used for cleaning various areas of the surfaces of a freshly sawed cut of meat.

As best shown in FIGS. 2 and 3, working edges 6, 8 and 10 each have thicknesses greater than that of the remainder of the body 2. This is an essential feature of the tool of the invention since it provides leading working edges, as at 12, 14 and 16 on edges 6, 8 and 10, respectively, when the body 2 is flexed as the tool is grasped in a natural manner and drawn over the surface of a freshly sawed meat cut by the person dressing the meat. This arrangement insures an angular point of contact along any working edge of the tool with the surface of the meat being dressed when the tool is flexed as it is used in natural manner by the meat processor. Thus, the tool can be used in a natural manner so that the meat processor can quickly and efficiently clean off the entire surface of the freshly sawed cut of meat.

It will be noted that the working edges of the tool decrease from a maximum thickness at the extremity of each working edge to the thickness of the remainder of the body 2 a short distance, which may vary slightly in accordance with the overall size of body 2 and the size of the meat cut to be dressed, from the extremity of the working edge, as best shown in FIGS. 2, 3, 7 and 8.

In operation, a cut of freshly sawed meat to be dressed by removing from the sawed surfaces thereof particles of bone dust, meat and fat is first supported on a flat surface with one face of the sawed cut directed upwardly. Then, the meat processor grasps the tool of the invention and draws it across the upwardly directed surface of the meat cut with one of the working edges 6, 8 or 10 in contact therewith. The choice of working edges used depends on the size of the meat cut being dressed or the particular area of a meat cut being dressed.

As the tool of my invention is thus used, particles of bone dust, fat and meat will accumulate on the working edge thereof. These accumulations may be easily removed by wiping the side of the working edge on a rigid edge of metal, wood or the like or on a disposable paper cloth. The tool can also be cleaned by immersing it in water or it may be rinsed by holding it under running water. The tool can easily be sterilized by boiling it in hot water for a time.

Use of the tool of my invention will not cause damage to the tissue of meat surfaces being dressed since the working edge of the tool will yield before it tears any meat tissue because of the flexible, resilient plastic material of which it is made.

FIGS. 4, 5 and 6 show modified embodiments of the tool of the invention, designated 2a, 2b and 2c, respectively, which have different shaped manually graspable portions, designated 4a, 4b and 4c, respectively. The bottom working edges are designated 6a, 6b and 6c, respectively, while the side working edges of the tools shown in FIGS. 5 and 6 are designated 8b, 10b and 8c, 10c, respectively.

It will be noted that although I have shown the preferred embodiment of the tool of the invention as having three working edges, the working edges may be varied in number and size as desired.

I claim:

1. An edged tool for dressing freshly cut meat comprising a resilient plastic sheet having a first portion adapted to be grasped manually, and an enlarged working portion integral with said first portion, said working portion having a maximum thickness at its outer end and tapering from said maximum thickness to a minimum thickness at the end adjacent said first portion, said working portion providing a pair of leading working edges at said outer end.

2. An edged tool for dressing freshly cut meat as defined by claim 1 in which said working portion is symmetrical with respect to said first portion and each side of said working portion tapers from said maximum thickness to said minimum thickness.

References Cited

UNITED STATES PATENTS

| | | | |
|---|---|---|---|
| 229,430 | 6/1880 | Linscott | 15—245 |
| 1,192,910 | 8/1916 | Lawrence | 15—236 |
| 2,437,316 | 3/1948 | Gambino et al. | 15—236 |
| 2,449,092 | 9/1948 | Struble | 15—236 |
| 2,444,653 | 7/1948 | Kennedy et al. | 15—245 X |
| 2,489,483 | 11/1949 | Czapar | 15—236 X |
| 2,593,304 | 4/1952 | Howard | 15—236 X |
| 2,831,519 | 4/1958 | Anderson et al. | 15—236 X |
| 3,028,692 | 4/1962 | Brock | 15—245 X |
| 3,091,791 | 6/1963 | Czapar | 15—245 |

WALTER A. SCHEEL, Primary Examiner

L. G. MACHLIN, Assistant Examiner

U.S. Cl. X.R.

128—304; 30—169